United States Patent
Tsuchida

(10) Patent No.: US 9,165,757 B2
(45) Date of Patent: Oct. 20, 2015

(54) STROBOSCOPIC DEVICE WITH FLASH DISCHARGE TUBE HAVING CONDUCTIVE FILM ON OUTER PERIPHERY

(75) Inventor: Shigeru Tsuchida, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 239 days.

(21) Appl. No.: 14/004,531

(22) PCT Filed: Mar. 23, 2012

(86) PCT No.: PCT/JP2012/002018
§ 371 (c)(1),
(2), (4) Date: Sep. 11, 2013

(87) PCT Pub. No.: WO2012/132360
PCT Pub. Date: Oct. 4, 2012

(65) Prior Publication Data
US 2014/0001947 A1    Jan. 2, 2014

(30) Foreign Application Priority Data
Mar. 29, 2011  (JP) .................................. 2011-071648

(51) Int. Cl.
*H01J 5/16*     (2006.01)
*H01J 61/40*    (2006.01)
*H01J 61/80*    (2006.01)
*G03B 15/05*    (2006.01)

(52) U.S. Cl.
CPC .................. *H01J 61/80* (2013.01); *G03B 15/05* (2013.01); *G03B 2215/0578* (2013.01); *G03B 2215/0582* (2013.01)

(58) Field of Classification Search
None
See application file for complete search history.

(56) References Cited

FOREIGN PATENT DOCUMENTS

| JP | 2002-23229 A | 1/2002 |
|----|----|----|
| JP | 2002-99029 A | 4/2002 |
| JP | 2006-107803 A | 4/2006 |

OTHER PUBLICATIONS

English machine translation of JP 2006-107803 (Hayashi et al).*
International Search Report for PCT/JP2012/002018, Jul. 17, 2012.

* cited by examiner

*Primary Examiner* — Natalie Walford
(74) *Attorney, Agent, or Firm* — RatnerPrestia

(57) ABSTRACT

A stroboscopic device includes a flash discharge tube with a conductive film on its outer periphery, a conductive reflector into which the flash discharge tube is inserted, and a heat-resistant conductive medium laminated on a part of the conductive film of the flash discharge tube. The reflector is electrically connected to the conductive film of the flash discharge tube via the conductive medium. This achieves the stroboscopic device with long service life and high reliability by preventing or suppressing occurrence of spark.

6 Claims, 3 Drawing Sheets

STROBOSCOPIC DEVICE WITH FLASH DISCHARGE TUBE HAVING CONDUCTIVE FILM ON OUTER PERIPHERY

This application is a U.S. National Phase Application of PCT International Application PCT/JP2012/002018.

TECHNICAL FIELD

The present invention relates to stroboscopic devices used as artificial light source for photography using cameras (imaging devices) equipped with photosensitizing agent, such as silver halide film, or image pickup device, such as CCD image sensor and CMOS image sensor.

BACKGROUND ART

Conventionally, this type of stroboscopic device is configured as shown in FIGS. 3A and 3B. FIG. 3A is a front view of a conventional stroboscopic device, and FIG. 3B is a side view of the conventional stroboscopic device.

As shown in FIGS. 3A and 3B, the conventional stroboscopic device includes flash discharge tube 1 having glass bulb 2 in which xenon (Xe) is filled and at least a pair of electrodes 3a and 3b sealed at its both ends, reflector 6 into which flash discharge tube 1 is inserted, and optical panel 8 disposed at the front of reflector 6. The conventional stroboscopic device is configured to illuminate an object to direct light emitted from flash discharge tube 1 and light reflected on reflector 6 via optical panel 8.

One electrode 3a of flash discharge tube 1 is connected to a lead wire (not illustrated) that is connected to, for example, a main capacitor (not illustrated). The other electrode 3b of flash discharge tube 1 is connected to a lead wire (not illustrated) that is directly connected to, for example, a grounding wire.

Transparent conductive film 4 is formed on an outer periphery of glass bulb 2 of flash discharge tube 1 as a trigger electrode for discharge excitation of flash discharge tube 1. An outer face of reflector 6 is formed of a conductive material, and is connected to a trigger lead wire (not illustrated).

The stroboscopic device as configured above emits light in the following way.

First, trigger voltage from the charged main capacitor is supplied to conductive film 4 of flash discharge tube 1 via the trigger lead wire and reflector 6. Then, the trigger voltage is applied to flash discharge tube 1 via reflector 6. This excites xenon gas inside glass bulb 2 of flash discharge tube 1. Flash discharge tube 1 emits light by consuming charge energy supplied from the main capacitor.

Therefore, conductive film 4 formed on the outer periphery of flash discharge tube 1 needs to be firmly attached to reflector 6 in order to electrically connect conductive film 4 to reflector 6.

For this purpose, in the conventional stroboscopic device, a rubber bushing such as a belt-like resilient member (not illustrated) is hooked to both ends of glass bulb 2 such that the rubber bushing crosses the outer face side (the side not facing glass bulb 2) of bottom 6a of reflector 6. This pulls flash discharge tube 1 toward bottom 6a of reflector 6, so as to firmly attach conductive film 4 of flash discharge tube 1 to the inner face of bottom 6a of reflector 6. (For example, see PTL 1.)

However, since conductive film 4 of flash discharge tube 1 and the inner face of bottom 6a of reflector 6 have different surface roughness, they are electrically connected at scattered points in a narrow sense, instead of plane contact. Therefore, electric current concentrates on non-contact points, to be exact, between scattered contact points. This is likely to cause spark (discharge). If spark occurs, conductive film 4 carbonizes due to the Joule heat, and its resistance increases. If the resistance of conductive film 4 increases, spark is likely to occur more. At last, flash discharge tube 1 will not emit light.

The above disadvantage is particularly noticeable in case of light emissions for communications by communications signals using consecutive light-emitting pattern between master strobe and slave strobe, or continuous light emission such as flat light emission that keeps long light-emitting time by intermittent light emission at fine pitch (e.g., 50 kHz).

CITATION LIST

Patent Literature

PTL 1 Japanese Patent Unexamined Publication No. 2002-23229

SUMMARY OF THE INVENTION

To solve the above disadvantage, a stroboscopic device of the present invention includes a flash discharge tube with conductive film on its outer periphery, a conductive reflector into which the flash discharge tube is inserted, and a heat-resistant conductive medium laminated on a part of the conductive film of the flash discharge tube. The reflector is electrically connected to the conductive film of the flash discharge tube via the conductive medium.

This avoids the situation of less light emission of the flash discharge tube or stoppage of light emission. As a result, occurrence of sparks can be prevented or suppressed, achieving the flash discharge tube with long service life and high reliability.

DESCRIPTION OF EMBODIMENTS

An exemplary embodiment of a stroboscopic device of the present invention is described below with reference to drawings. In the following description, same reference marks are given to same or equivalent components.

EXEMPLARY EMBODIMENT

Figure 1A:
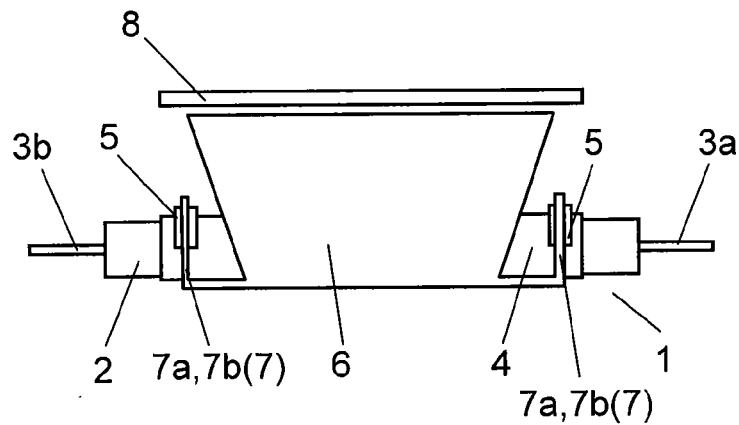
FIG. 1A is a front view of a stroboscopic device in accordance with an exemplary embodiment of the present invention.

The stroboscopic device in the exemplary embodiment of the present invention is described below with reference to FIGS. 1A to 1C. FIG. 1A is a front view of the stroboscopic device in the exemplary embodiment of the present invention.

Figure 1B:
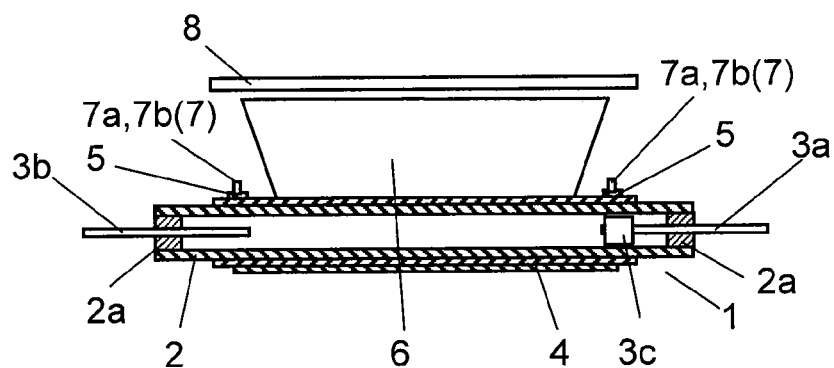
FIG. 1B is a front sectional view of the stroboscopic device in accordance with the exemplary embodiment of the present invention.

FIG. 1B is a front sectional view of the stroboscopic device in the exemplary embodiment. FIG. 1C is a side view of the stroboscopic device in the exemplary embodiment.

Figure 1C:
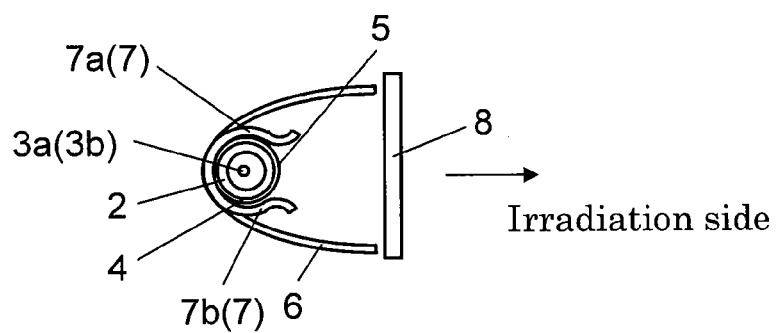
FIG. 1C is a side view of the stroboscopic device in accordance with the exemplary embodiment.

As shown in FIGS. 1A to 1C, the stroboscopic device in the exemplary embodiment at least includes straight flash discharge tube 1, conductive film 4 formed on an outer periphery of flash discharge tube 1, conductive medium 5 laminated on a part of conductive film 4, reflector 6 into which flash discharge tube 1 is inserted, and optical panel 8. Reflector 6 includes conductive extended part 7 connected to conductive medium 5. In flash discharge tube 1, rare gas (e.g., xenon (Xe) gas) is filled inside glass bulb 2 and a pair of electrodes 3a and 3b is sealed at least at both ends of glass bulb 2. Optical panel 8 is disposed at the front of reflector 6, and is configured with transparent or semi-transparent material with translucency, such as acrylic resin. The stroboscopic device is configured to illuminate an object to direct light emitted from flash discharge tube 1 and light reflected on reflector 6 via optical panel 8.

Next, each component configuring the stroboscopic device in the exemplary embodiment is detailed.

Flash discharge tube 1 includes straight glass bulb 2 typically formed of hard borosilicate glass, a pair of electrodes 3a and 3b sealed via bead glass 2a at both ends of glass bulb 2, and transparent conductive film 4 laminated on an outer periphery of glass bulb 2.

The pair of electrodes 3a and 3b of flash discharge tube 1 is configured with a metal bar, such as tungsten. The pair of electrodes 3a and 3b is sealed such that they partially protrude outside in the axial direction of flash discharge tube 1. With this structure, one electrode 3b configures an anode electrode, and the other electrode 3a configures a cathode electrode by attaching sintered metal 3c to the metal bar typically by caulking.

A method of forming sintered metal 3c is described below.

First, sintered metal 3c is formed, for example, of a mixture of fine metal powder of tantalum and niobium, or a mixture of fine metal powder of tantalum and nickel. Pressed metal of the above mixture is sintered at a high temperature, such as at around 1600° C., to make a sintered body.

Next, the sintered body prepared is immersed in a solution, such as cesium carbonate and cesium sulfate, to impregnate the sintered body with cesium.

Then, the sintered body impregnated with cesium is dried to make sintered metal 3c.

Sintered metal 3c is inserted near a tip of the metal bar, such as tungsten, and caulked to form the cathode electrode.

Conductive film 4 is formed by laminating a transparent film, such as tin oxide or indium oxide, on the outer periphery of glass bulb 2. Conductive film 4 functions as a trigger electrode for discharge excitation of flash discharge tube 1. For example, conductive film 4 is formed on the outer periphery of glass bulb 2 typically by application, deposition, or solution-dipping method.

Conductive coating 5, which is conductive medium 5 made of a material such as silver paste, is laminated on a part of conductive film 4, typically by application. This conductive coating 5 has resistance lower than that of conductive film 4. Here, conductive coating 5 made of silver paste with low electric resistance laminated on conductive film 4 improves adhesion by firmly fixing transparent conductive film 4 while securing the thickness. This increases the strength against spark that may occur due to locally concentrated electric current. In addition, since conductive coating 5 has lower resistance than that of conductive film 4, electric current smoothly flows, reducing the possibility of spark. Furthermore, conductive coating 5 made typically of silver paste has flexibility, and thus it can be attached to the reflector in plane contact. This prevents spark that may occur due to contact at scattered points.

Conductive coating 5 is preferably laminated thicker than conductive film 4. At applying conductive coating 5, a material of conductive coating 5 is applied in a predetermined thickness. Conductive coating 5 may be formed by deposition or other known lamination methods, in addition to lamination by application. This enables to control thickness and surface roughness of conductive coating 5 at high accuracy.

In addition, as shown in FIGS. 1A and 1B, conductive coating 5 is provided near an end of the outer periphery of glass bulb 2 (near the pair of electrodes) where conductive film 4 is formed. It is further preferable to provide conductive coating 5 on both ends of glass bulb 2 where conductive film 4 is formed. In this way, conductive coating 5 is formed at a position facing a tip of the pair of electrodes 3a and 3b of flash discharge tube 1 (inside glass bulb 2), or near the tip of the pair of electrodes 3a and 3b.

As shown in FIG. 1C, conductive coating 5 is formed in the circumferential direction of glass bulb 2 of flash discharge tube 1. Here, conductive coating 5 may be formed on the entire circumference of glass bulb 2 of flash discharge tube 1, or partially in the circumferential direction. If conductive coating 5 is provided on the entire circumference, flash discharge tube 1 can be easily assembled (attached) to reflector 6 because there is no directionality in conductive coating 5 of flash discharge tube 1 to be connected to reflector 6, as described later. On the other hand, if conductive coating 5 is provided partially in the circumferential direction, a manufacturing cost can be reduced because an area where conductive coating 5 is applied is less. In this case, conductive coating 5 is formed at least on an area connected to reflector 6.

Optical panel 8 is configured with square resin sheet. A light-collecting face of a Fresnel lens that has light-collecting effect is formed on the front face of optical panel 8. A wavy light-diffusing face that has light-diffusing effect is formed on the rear face of optical panel 8, facing the opening of reflector 6.

Next, the reflector used in the stroboscopic device in the exemplary embodiment is detailed with reference to FIG. 2.

Figure 2:
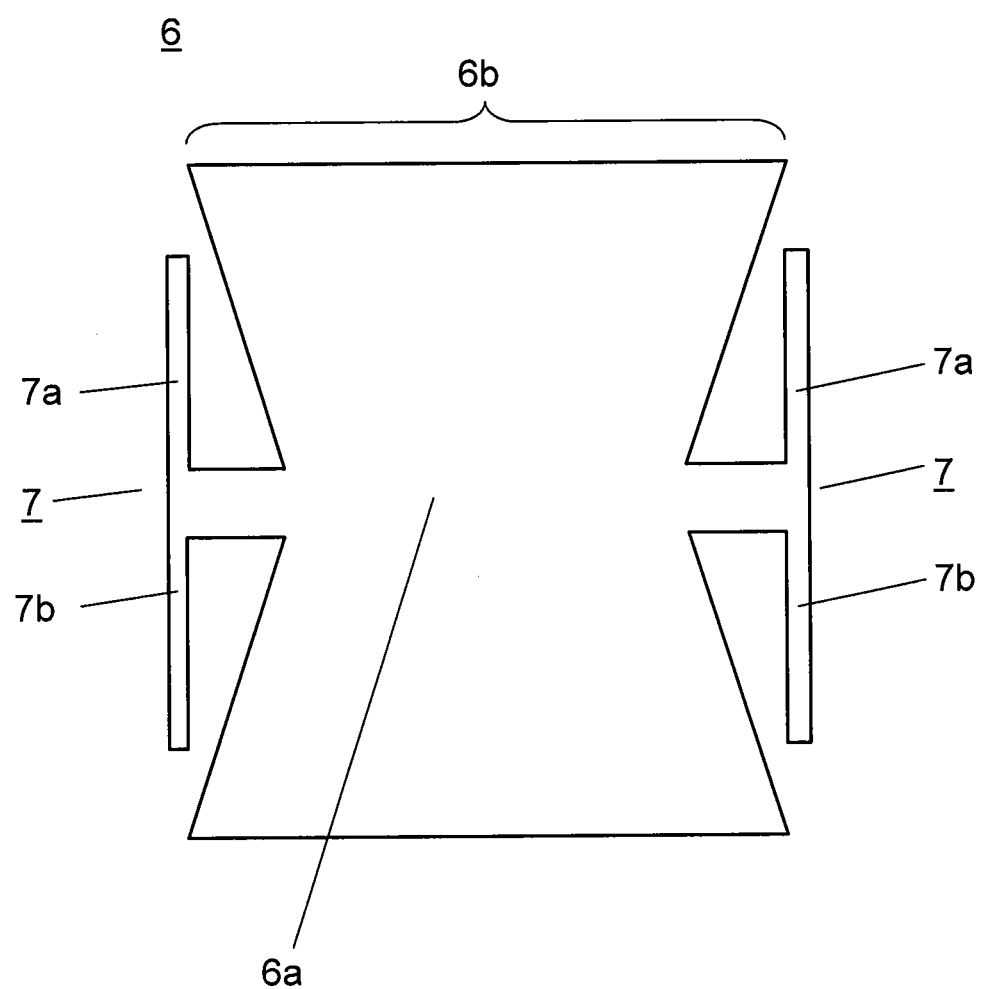
FIG. 2 is a development view of a reflector used in the stroboscopic device in accordance with the exemplary embodiment.
Figure 3A:
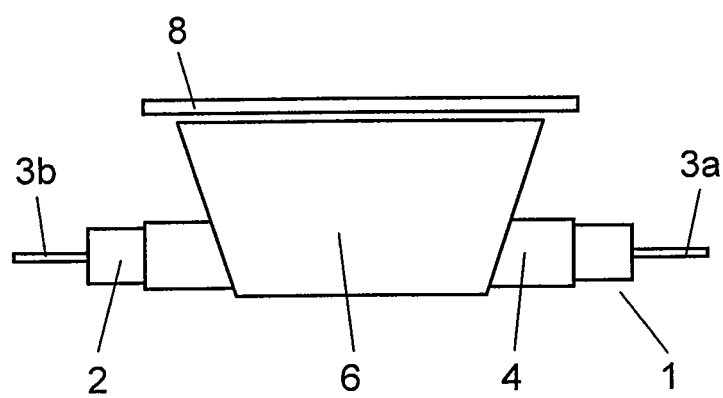
FIG. 3A is a front view of a conventional stroboscopic device.
Figure 3B:
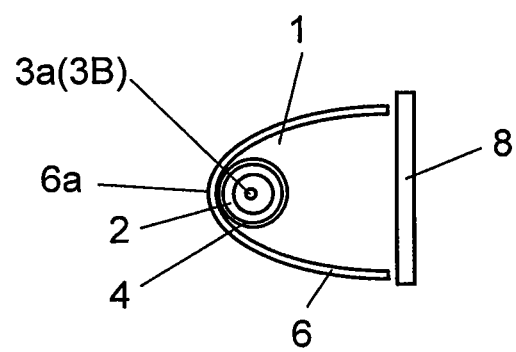
FIG. 3B is a side view of the conventional stroboscopic device.

FIG. 2 is a development view of the reflector used in the stroboscopic device in the exemplary embodiment.

First, to form reflector 6, a thin photoluminescent sheet, such as aluminum sheet, is cut into a predetermined shape.

Then, the cut aluminum sheet is bent to substantially U shape or inverted parabolic shape.

Then, an edge of the bent aluminum sheet is bent inward.

This completes reflector 6 with U-shaped concavity and a pair of side faces (not illustrated). A reflecting surface for reflecting light directly emitted from flash discharge tube 1 is formed on the inner face of the cavity.

An opening, such as a round opening, slightly larger than an outer diameter of flash discharge tube 1 is formed in each of the pair of side faces. Flash discharge tube 1 is inserted from one opening of reflector 6, and an end of flash discharge tube 1 is protruded from the other opening to insert flash discharge tube 1 into reflector 6.

As shown in FIG. 2, reflector 6 has extended part 7 where a pair of holders 7a and 7b is formed. Extended part 7 extends laterally from bottom 6a of reflector 6.

A method of forming extended part 7 of reflector 6 in this exemplary embodiment is described below.

First, as shown in FIG. 2, a thin photoluminescent sheet, such as an aluminum sheet, is cut into a shape conforming to a combined shape of main body 6b and extended part 7 of reflector 6. Here, a portion equivalent to extended part 7 is formed in a substantially T-shape protruding from bottom 6a of reflector 6.

Next, a pair of holders 7a and 7b of extended part 7 is made by bending the sheet to an arc shape or substantially C-shape (including C-shape), as shown in FIG. 1C. This forms a holding part that resiliently holds flash discharge tube 1 by the pair of holders 7a and 7b of extended part 7.

The pair of holders 7a and 7b of extended part 7 is formed in the arc shape (C-shape) with the inner diameter slightly smaller than the outer diameter of glass bulb 2 of flash discharge tube 1. This is because, to be exact, the arc-like inner diameter formed by each of the pair of holders 7a and 7b of extended part 7 is the outer diameter combining glass bulb 2, conductive film 4, and conductive coating 5. However, thicknesses of conductive film 4 and conductive coating 5 have almost no influence on widening of the outer diameter of glass bulb 2. Accordingly, there is no problem to practically consider based on the outer diameter of glass bulb 2.

When flash discharge tube 1 is inserted between arc-shaped holders 7a and 7b with the inner diameter slightly smaller than the outer diameter of glass bulb 2, the pair of holders 7a and 7b clamps flash discharge tube 1. As shown in FIG. 1C, tips of the pair of holders 7a and 7b are preferably bent and tapered such that the arc-like opening is broadened so that flash discharge tube 1 can be easily inserted.

As shown in FIG. 1A or 1C, conductive coating 5 provided on glass bulb 2 is formed partially in the circumferential direction, e.g., halfway area, of glass bulb 2. More specifically, conductive coating 5 is provided on the irradiation side (front side when looking at the stroboscopic device from the front). Naturally, conductive coating 5 may be provided on the entire circumference in the circumferential direction of glass bulb 2. Flash discharge tube 1 is fitted into the pair of arc-shaped holders 7a and 7b of extended part 7 in reflector 6 from the side where conductive coating 5 is not provided. In this way, conductive coating 5 and extended part 7 make contact at the tip sides of the pair of holders 7a and 7b of extended part 7.

The holding part including the pair of arc-shaped holders 7a and 7b of extended part 7 resiliently holds flash discharge tube 1. Still more, since elasticity becomes stronger toward the tip side of the holding part including the pair of holders 7a and 7b, the pair of holders 7a and 7b firmly attaches and connects reflector 6 to conductive coating 5.

Next is described, although not illustrated, the light-emitting operation of the stroboscopic device in the exemplary embodiment.

First, the stroboscopic device in the exemplary embodiment includes a stroboscopic circuit configured with circuit components including a synchronized switch, main capacitor, trigger capacitor, and transformer. For example, a lead wire connected to the main capacitor is connected to one electrode 3a of flash discharge tube 1. A lead wire directly or indirectly connected to a grounding wire is connected to the other electrode 3b of flash discharge tube 1. In addition, a lead wire (trigger lead wire) connected to the trigger capacitor is connected to the outer face of reflector 6.

Then, the trigger voltage from charged the main capacitor is supplied to conductive film 4 of flash discharge tube 1 via the trigger lead wire and extended part 7 of reflector 6. The trigger voltage supplied to conductive film 4 is also applied to the conductive coating, which is conductive medium 5, formed on the outer periphery of flash discharge tube 1. This excites xenon gas filled in glass bulb 2 of flash discharge tube 1, and flash discharge tube 1 emits light by consuming charge energy supplied from the main capacitor.

In other words, in this exemplary embodiment, conductive coating 5 and conductive film 4 make a plane contact by laminating heat-resistant conductive coating 5 on conductive film 4. This suppresses occurrence of spark, and also avoids the situation of less light emission of flash discharge tube 1 by reducing thermal damage to conductive coating 5 due to spark. As a result, occurrence of spark is prevented or suppressed to achieve a stroboscopic device with long service life and high reliability.

The present invention is not limited to the above exemplary embodiment. It is apparent that all modifications falling the true spirit and scope of the present invention are applicable.

More specifically, the exemplary embodiment refers to an example of electrically connecting conductive coating 5 on conductive film 4 of flash discharge tube 1 to reflector 6 via extended part 7 laterally extending from reflector 6. However, the present invention is not limited to this connection. For example, conductive coating 5 may be laminated on conductive film 4 such that conductive coating 5 exists between conductive film 4 of flash discharge tube 1 and the inner bottom face of reflector 6, without providing extended part 7. This enables to apply the trigger voltage along the longitudinal direction of the flash discharge tube via uniform and low-resistance conductive coating 5 and conductive film 4.

Still more, the exemplary embodiment refers to an example of extending a pair of extended parts 7 from both sides of the main body of reflector 6. However, the present invention is not limited to this structure. For example, extended part 7 may be provided only on one side of reflector 6. This can simplify the structure of the extended part, and also broadens the reflection range.

Still more, the exemplary embodiment refers to the structure that the inner face of bottom 6a of reflector 6 and the outer periphery of conductive film 4 make contact. However, the present invention is not limited to this structure. For example, the stroboscopic device may be configured such that the inner face of bottom 6a of reflector 6 and the outer periphery of conductive film 4 of flash discharge tube 1 are spaced by adjusting the dimensional relationship of the pair of holders 7a and 7b of extended part 7 configuring the holding part. This enables to finely adjust the distance between flash discharge tube 1 and reflector 6, so as to adjust light-collecting efficiency.

As described above, the stroboscopic device of the present invention includes the flash discharge tube with the conductive film on its outer periphery, the conductive reflector into which the flash discharge tube is inserted, and the heat-resistant conductive medium laminated on a part of the conductive film of the flash discharge tube. The reflector is electrically connected to the conductive film of the flash discharge tube via the conductive medium.

With this structure, the trigger voltage is supplied to the conductive film of the flash discharge tube via the reflector and the conductive medium. The trigger voltage is thus applied to the flash discharge tube via the reflector, and xenon gas of the flash discharge tube is excited to emit light.

Since the conductive medium is laminated on the conductive film, and the conductive medium and the conductive film are making plane contact, spark does not occur between the conductive medium and the conductive film. However, the conductive medium and the reflector have different surface roughness. Therefore, to be exact, they may be electrically connected at scattered points instead of plane contact. Accordingly, same as the conventional stroboscopic device, electric current may concentrate on an area making contact at scattered points. This may cause spark between the conductive medium and the reflector.

However, since the conductive medium is heat-resistive, it will not be damaged, such as carbonized, by the Joule heat of spark. Therefore, although spark occurs, an area where resistance locally increases is not generated in the conductive medium, and thus consecutive occurrence of spark can be prevented. Accordingly, the situation of less light emission of the flash discharge tube or stoppage of light emission is avoidable. As a result, the stroboscopic device with long service life and high reliability can be achieved by preventing occurrence of spark or suppressing occurrence of spark.

Still more, in the stroboscopic device of the present invention, the conductive medium is laminated on an end area of the conductive film of the flash discharge tube, and the extended part is provided on one side of the reflector. The extended part is electrically connected to the end area of the conductive film of the flash discharge tube via the conductive medium.

Still more, in the stroboscopic device of the present invention, the conductive medium is laminated on both end areas of the conductive film of the flash discharge tube, and the extended part is provided on both sides of the reflector. The pair of the extended parts is electrically connected to the both end areas of the conductive film of the flash discharge tube via the conductive medium.

In this structure, the conductive medium is provided at a position out of the reflector (i.e., at a position not blocking the irradiated light), and can be electrically connected to the extended part of the reflector. This enables to provide conductive coating 5 at a position not blocking the light directly emitted to an object (irradiated light) from flash discharge tube 1 via optical panel 8. As a result, reduction of quantity of irradiated light due to conductive coating 5 can be prevented. The stroboscopic device that can emit the same quantity of light as that of the conventional stroboscopic device can be achieved.

Still more, the stroboscopic device of the present invention further includes the holding part for resiliently holding the flash discharge tube.

With this structure, both end parts of flash discharge tube 1 laterally protruding from the opening of reflector 6 are held by the holding part formed with holders 7a and 7b of extended part 7 of reflector 6. The extended part configuring the holding part positions the reflector and the flash discharge tube, so as to integrate the flash discharge tube and the reflector. This allows eliminating a rubber bushing that is necessary in the conventional stroboscopic device. As a result, the stroboscopic device with reduced manufacturing cost can be achieved.

Still more, in the stroboscopic device of the present invention, a resistance of the conductive medium is lower than a resistance of the conductive film of the flash discharge tube.

This structure prevents or reduces the trigger electric current from directly travelling to the conductive film from the reflector even when the conductive medium and the reflector make contact or the conductive film and the reflector make contact as in the conventional stroboscopic device because the resistance of conductive coating 5 is lower than that of conductive film 4. As a result, thermal damage due to spark of the conductive film that occurs in the conventional stroboscopic device can be further effectively prevented.

Furthermore, in the stroboscopic device of the present invention, the conductive medium is made of a conductive coating with a thickness thicker than a thickness of the conductive film of the flash discharge tube.

This structure further improves heat resistance of the conductive medium, and can effectively reduce thermal damage to the conductive medium.

INDUSTRIAL APPLICABILITY

The present invention prevents or suppresses occurrence of spark by electrically connecting the reflector and the conductive film of the flash discharge tube via the conductive medium laminated on part of the conductive film of the flash discharge tube. Accordingly, the present invention is effectively applicable typically to stroboscopic devices equipped with a flash discharge tube requiring long service life and promising high reliability.

REFERENCE MARKS IN THE DRAWINGS

1 Flash discharge tube
2 Glass bulb
2a Bead glass
3a, 3b Electrode
3c Sintered metal
4 Conductive film
5 Conductive coating (conductive medium)
6 Reflector
6a Bottom
6b Main body
7 Extended part
7a, 7b Holder
8 Optical panel

The invention claimed is:

1. A stroboscopic device comprising:
    a flash discharge tube with a conductive film on its outer periphery;
    a conductive reflector into which the flash discharge tube is inserted; and
    a heat-resistant conductive medium laminated on a part of the conductive film of the flash discharge tube,
    wherein
    the reflector is electrically connected to the conductive film of the flash discharge tube via the conductive medium, and
    a resistance of the conductive medium is lower than a resistance of the conductive film of the flash discharge tube.

2. The stroboscopic device of claim 1,
    wherein
    the conductive medium is laminated on an end area of the conductive film of the flash discharge tube, and an extended part is provided on a side of the reflector, the extended part being electrically connected to the end area of the conductive film of the flash discharge tube via the conductive medium.

3. The stroboscopic device of claim 2,
    wherein
    the conductive medium is laminated on both end areas of the conductive film of the flash discharge tube, and the extended part is provided on both sides of the reflector, a pair of the extended parts being electrically connected to the both end areas of the conductive film of the flash discharge tube via the conductive medium.

4. The stroboscopic device of claim 2,
    wherein
    the extended part further includes a holder for resiliently holding the flash discharge tube.

5. The stroboscopic device of claim 1,
    wherein
    the conductive medium is a conductive coating with a thickness thicker than a thickness of the conductive film of the flash discharge tube.

6. The stroboscopic device of claim 3, wherein
the extended part further includes a holder for resiliently holding the flash discharge tube.

* * * * *